(12) United States Patent
Boutin et al.

(10) Patent No.: US 10,760,880 B2
(45) Date of Patent: Sep. 1, 2020

(54) IGNITER CASE (71) Applicant: AUTOLIV DEVELOPMENT AB, Vargarda (SE)

(72) Inventors: Patrice Boutin, Taverny (FR); Jose Reinoso, Aulnay sous Bois (FR); Jesse Guymon, Clinton, UT (US); Matthew Erni, Clinton, UT (US); Mason Wayment, Roy, UT (US)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 16/555,176

(22) Filed: Aug. 29, 2019

(65) Prior Publication Data

US 2019/0383589 A1 Dec. 19, 2019

Related U.S. Application Data (63) Continuation of application No. 15/538,755, filed on Jun. 22, 2017, now Pat. No. 10,584,945.

(51) Int. Cl.
*F42B 3/198* (2006.01)
*F42B 3/12* (2006.01)
*F42B 3/04* (2006.01)
*B60R 21/26* (2011.01)

(52) U.S. Cl.
CPC .............. *F42B 3/198* (2013.01); *F42B 3/04* (2013.01); *F42B 3/127* (2013.01); *B60R 2021/26029* (2013.01)

(58) Field of Classification Search
CPC ........... B60R 2021/26029; F42B 3/198; F42B 3/127; F42B 3/04; F42B 3/125
See application file for complete search history.

(56) References Cited

U.S. PATENT DOCUMENTS

| 4,724,765 A | * | 2/1988 | Evrard ................... F42B 12/40 102/248 |
| 5,443,286 A | * | 8/1995 | Cunningham ...... B60R 21/2644 280/741 |
| 5,603,525 A | * | 2/1997 | Zakula .................. B60R 21/268 102/202.14 |
| 5,632,505 A | * | 5/1997 | Saccone ................ B60R 21/264 137/68.13 |
| 5,803,492 A | * | 9/1998 | Rink ..................... B60R 21/272 222/3 |

(Continued)

*Primary Examiner* — Paul N Dickson
*Assistant Examiner* — Timothy Wilhelm
(74) *Attorney, Agent, or Firm* — Stephen T. Olson; Harness, Dickey & Pierce, P.L.C.

(57) ABSTRACT

A metallic case for a pyrotechnical igniter of a gas generator for a vehicle safety device that includes a peripheral side wall, a closed end, and a weak zone in the peripheral side wall. The weak zone extends along a continuous trace having a first end portion, a second end portion, and an intermediate portion between the first and second end portions. The first and second end portions of the continuous trace both transition from a first point having a first side wall depth to a second point having a second side wall depth. The second side wall depth is greater than the first side wall depth. The weak zone is configured for opening a vent in the peripheral side wall in response to an increase of pressure within the metallic case.

23 Claims, 4 Drawing Sheets

(56) References Cited

U.S. PATENT DOCUMENTS

| | | | |
|---|---|---|---|
| 6,012,737 A * | 1/2000 | Van Wynsberghe | B60R 21/2644 280/737 |
| 6,116,642 A * | 9/2000 | Shirk | B60R 21/264 280/736 |
| 6,145,877 A * | 11/2000 | Rink | B60R 21/264 280/737 |
| 6,491,321 B1 * | 12/2002 | Nakashima | B01D 46/24 102/530 |
| 6,820,559 B1 * | 11/2004 | Comtesse | F42B 15/38 102/378 |
| 6,848,365 B2 * | 2/2005 | Avetisian | F42B 3/195 102/202.5 |
| 6,941,867 B2 * | 9/2005 | Renz | F42B 3/125 102/202.11 |
| 7,357,083 B2 * | 4/2008 | Takahara | F42B 3/127 102/202.14 |
| 7,549,375 B2 * | 6/2009 | Cook | F42B 39/14 102/377 |
| 7,607,688 B2 * | 10/2009 | Kato | F42B 3/04 137/68.27 |
| 7,658,406 B2 * | 2/2010 | Townsend | B60R 21/264 280/736 |
| 7,730,837 B2 * | 6/2010 | Lahitte | F42B 3/127 102/202.12 |
| 7,845,278 B2 * | 12/2010 | Brisighella, Jr. | B60R 21/26 102/202.11 |
| 8,186,274 B2 * | 5/2012 | Van Stratum | F42B 5/26 102/469 |
| 8,276,514 B2 * | 10/2012 | Fink | F42B 3/198 102/202.12 |
| 8,590,930 B2 * | 11/2013 | Mitsunabe | C06D 5/00 280/741 |
| 8,602,183 B2 * | 12/2013 | VandenBerge | F16F 7/128 188/372 |
| 8,636,164 B2 * | 1/2014 | Hernandez | F16K 17/1606 137/68.19 |
| 8,651,520 B2 * | 2/2014 | Jung | B60R 21/272 280/737 |
| 8,893,622 B2 * | 11/2014 | Jackson | B60R 21/2644 102/530 |
| 9,463,767 B2 * | 10/2016 | Ruckdeschel | B60R 21/264 |
| 10,179,561 B2 * | 1/2019 | Jung | B01D 46/2403 |
| 2003/0177936 A1 * | 9/2003 | Luebbers | B60R 21/26 102/530 |
| 2004/0107856 A1 * | 6/2004 | Hennings | F42B 3/127 102/202.7 |
| 2004/0216631 A1 * | 11/2004 | Fink | F42B 3/103 102/200 |
| 2007/0261582 A1 * | 11/2007 | Lahitte | F42B 3/127 102/202.5 |
| 2009/0044715 A1 * | 2/2009 | Hartl | F42B 3/103 102/202.9 |
| 2009/0179408 A1 * | 7/2009 | Brisighella, Jr. | B60R 21/26 280/741 |
| 2018/0292185 A1 * | 10/2018 | Courtaux | F42B 3/198 |

* cited by examiner

IGNITER CASE

CROSS-REFERENCE TO RELATED APPLICATION

This is a continuation-in-part application claiming priority to U.S. application Ser. No. 15/538,755 filed 22 Jun. 2017, the disclosure of which application is incorporated herein by reference.

FIELD

The present invention relates in a general manner to pyrotechnical igniters, which can be used in different pyrotechnical devices, in particular assembled in vehicles, and more particularly to the metallic cases used in these igniters and to their method of manufacture.

DISCUSSION

Pyrotechnical igniters have been used for many years in connection with vehicle safety devices such as inflatable airbags and seatbelt pretensioners for rapid deployment. For example, an airbag system will include an inflator having a pyrotechnical igniter to deploy the airbag. The inflator includes a gas generating material capable of rapidly producing a quantity of inflation gas for inflating the airbag during deployment. Influx of gas into the airbag inflates the airbag for deployment into the vehicle.

In order to rapidly deploy the airbag, the inflator includes an initiator or igniter. The initiator includes a charge within a case or cup that is triggered in response to an accident event. The case is generally a thin-walled structure that surrounds the charge. It is known to provide a weak zone in a side wall of the case for forming a vent hole. This weak zone assumes the shape of a local reduction of the thickness of the side wall. The thickness of the remaining material allows the vent hole to open at a pressure lower than a rupture pressure of the side wall when the interior of the case is subjected to a pressure. Activation of the charge creates an internal pressure within the case that is released from the case and, in turn, activates the gas generating material.

The precision of this reduction of thickness defining the weak zone contributes to a repeatable and reproducible functioning between the igniters manufactured and the devices into which the igniters are incorporated. A defect in the realisation of the weak zone can cause a poor opening of the vent hole, which can bring about a deterioration of the case, and potentially adverse performance of the device in which it is positioned.

In order to guarantee a good realisation of the weak zone, it is known to form a plane zone, which is formed on the side surface of the igniter prior to the realising of the weak zone, and is sufficiently large to receive the weak zone subsequently in the manufacture of the case. The striking on the plane zone allows the tolerances required for the thickness of the material remaining at the bottom of the weak zone to be achieved. Such tolerances are best achieved by a striking of the weak zone on a plane zone. The necessity for a plane zone requires complementary tools and incurs maintenance costs. Additionally, the plane zone reduces the useful internal volume of the case. Furthermore, the realisation of the plane zone causes deformations of the outer case surface. These deformations are problematic for the subsequent positioning of an external plastic hood, which generally serves to electrically insulate the igniter case from the outer environment of the igniter during the insertion of a glass crosspiece, which closes the igniter during the welding of the case on the glass crosspiece, and when the igniter receives an overmolding, since the tools must then be defined as properly as possible with the igniter. Finally, the shapes of certain weak zones may displace too much side wall material such that pinching of the stamping tool by the case material may occur and may result in failure of the stamping tool upon retraction.

Accordingly, a need for continuous improvement in the relevant art remains.

SUMMARY

It is a general goal of the present invention to respond to the disadvantages of the prior art cited above. It is one particular goal to propose a pyrotechnical igniter case with a weak zone supporting a rapid method of manufacturing that can be accurately repeated without undue stamping tool wear.

To this end, a first aspect of the invention relates to a process for manufacturing a metallic case of a pyrotechnical igniter comprising a wall, comprising at least one weak zone, and an inner surface in the case, with at least one part facing this at least one weak zone. The manufacturing process of which comprises the steps of positioning the case on a die or matrix, comprising a plane zone, and striking the wall with at least one punch in a single movement of striking. The single movement of striking deforms at least the part of the inner surface facing the at least one weak zone, defines at least one initially curved-in zone in order to bring it on this plane zone, forms, in this manner, a plane inner surface, and forms the at least one weak zone.

The process is simplified because a step of realising a plane zone on the case prior to the striking of the weak zone is no longer necessary since the process makes these two operations in one and the same striking movement. Moreover, this allows the limitation of the deformations generated by the striking of the weak zone on the case wall, while allowing the formation of a precise and reproducible weak zone. In fact, the plays between the piece to be made and the matrix should be taken into account at each striking step. These plays must be absorbed by the piece to be made. Therefore, any elimination of step eliminates plays and therefore limits the non-desired deformations. It can also be noted that the plastic deformations are imposed only once, which limits the variability on the total cold hammering of the material.

The weak zone positioned on the wall is designed to break at a predetermined pressure lower than a rupture pressure of this wall. The wall is advantageously a side wall. The process is more favourable to realising a weak zone on a side wall than on an end because, for a side strike, more positioning plays of the case on the matrix are necessary. Therefore, the elimination of a step is even more interesting.

The case is advantageously a piece made by a process of cold shaping, such as stamping. The case can be formed by soft nickeled steel, such as DC04 or DC06, standardized by the standard NF-EN-10130. Once the case has been stamped, prior to the formation of the weak zone, the outer surface of the case and the inner surface of the case are parallel in accordance with known stamping tolerances. Therefore, the outer surface, opposite an inner surface with a curved-in zone, also has a curved-in zone.

The wall is advantageously designed in such a manner as to define a charging volume. This at least one weak zone defines a vent hole, wherein the process is characterized in that the step of deforming at least the part of the inner surface facing this at least one weak zone and comprising at least one initially curved-in zone leaves at least a part of the vent hole curved in, so as to maximize the charging volume.

Since the process only deforms the surfaces necessary for shaping the weak zone, it limits to the minimum the deformations of the wall, which limits the impact of the making of the weak zone on the outer environment of the case. The addition of components, such as a protective hood, or the application of further processes, such as an insertion of a glass crosspiece and a welding of the case on the glass crosspiece, are therefore facilitated. In other words, only the part of the wall which is to receive the weak zone is deformed (planed), and if the weak zone forms a line in a circular arc, then the part of the wall situated in this circular arc will remain at least partially curved in.

This wall is advantageously a side wall of the case and the process comprises a step of ejecting the case from the matrix, according to an ejection axis of the case after the striking step, and in which the step of the formation of the inner plane surface comprises a step of forming the inner plane surface with a clearance angle relative to the direction of extraction. The clearance angle can be comprised between 0 and 1° and is advantageously comprised between 0 and 0.5°, borders included.

The process is advantageously characterized in that the step of striking the side wall with at least one punch permits the simultaneous forming of two, three, or four weak zones.

The wall advantageously comprises an outer surface of the case, wherein at least one weak zone is defined by a profile extending along a curved line comprised in a plane, and the step of striking the wall comprises a step of deforming at least one initially curved-in part of this outer surface in order to bring it into this plane and to form this at least one weak zone.

The fact of simultaneously forming an inner plane surface and a weak zone defined by a profile extending along a curved line comprised in a plane allows a predetermined rupture pressure of the weak zone, which is controlled and reproducible, to be guaranteed. In fact, it is simpler and easier to make and adjust tools whose striking surfaces are planar. Since the striking surfaces can be more readily realised, the weak zones of cases manufactured by different tools are more similar to each other and the population of the production is less dispersed.

The deformation step of this at least one part of the outer surface is advantageously a step of imposing an angle, which is not zero, between the plane of the outer surface and the inner plane surface.

The combination of the non-zero angle between the plane of the outer surface and the inner plane surface allows the location of the wall where the distance will be the lowest between the inner plane surface and the plane of the outer surface to be controlled. It is at this location that the resistance to rupture of the weak zone will be the weakest. Therefore, this allows a controlled and reproducible opening of the case to be assured when it is subjected to a pressure greater than the predetermined rupture pressure of the weak zone.

A second aspect of the invention relates to a metallic case of a pyrotechnical igniter manufactured according to the process of the first aspect of the invention. The metallic case includes a wall and at least one weak zone. The wall is designed to define a charging volume. The at least one weak zone is defined by a profile extending along a curved line positioned on the wall, and is designed to rupture at a predetermined pressure lower than a rupture pressure of the wall. The at least one weak zone defines a vent hole. The curved line is contained in a plane and at least a part of the vent hole is curved in such a manner as to maximise the charging volume. In other words, the vent hole presents an inner surface and an outer surface, and at least one part of the inner surface of the vent hole is curved in (therefore, just as the outer surface of the vent hole is curved in too).

The wall may be cylindrical with a circular base along an axis and the case may include a single weak zone, or two, three, or four weak zones, uniformly distributed around the axis. A uniform distribution allows avoiding having to balance the igniter comprising the case during its operation.

A third aspect of the invention relates to a pyrotechnical igniter comprising a case according to the second aspect of the invention and a glass crosspiece, which case is welded on the glass crosspiece. The pyrotechnical igniter may advantageously include an insulating hood and/or an overmolding.

A fourth aspect of the invention relates to a gas generator comprising at least one pyrotechnical igniter according to the present invention.

A fifth aspect of the invention relates to an automobile comprising at least one pyrotechnical igniter according to the present invention.

According to a sixth aspect, the present invention provides a metallic case for a pyrotechnical igniter of a gas generator for a vehicle safety device that includes a peripheral side wall, a closed end, and a weak zone in the peripheral side wall. The weak zone extends along a continuous trace, having a first end portion, a second end portion, and an intermediate portion between the first and second end portions. The first and second end portions of the trace both transition from a first point, having a first side wall depth, to a second point, having a second side wall depth. The second side wall depth is greater than the first side wall depth. The weak zone is configured to open a vent in the peripheral side wall in response to an increase of pressure within the metallic case.

BEST DESCRIPTION OF THE DRAWINGS

Other characteristics and advantages of the present invention will become more apparent upon reading the following detailed description of an embodiment of the invention, given solely by way of a non-limiting example, and illustrated by the attached drawings in which.

DETAILED DESCRIPTION

Figure 1:
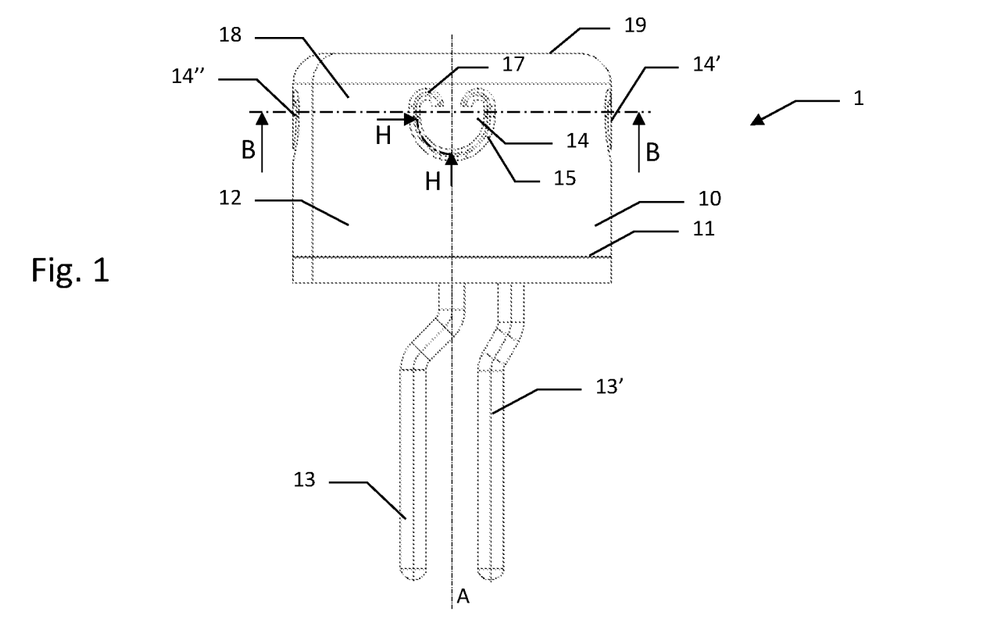
FIG. 1 is a side view of a pyrotechnical igniter according to the third aspect of the invention, manufactured with the process according to the first aspect of the invention.

FIG. 1 shows a side view of a pyrotechnical igniter 1, comprising a case 10 welded by a welding cord 11 to a glass crosspiece provided with two connection pins 13 and 13'. The pyrotechnical igniter 1 may be incorporated into a gas generator of a vehicle safety device, such as an inflatable airbag or seatbelt pretensioner.

The case 10 has a side wall 12 with a generally cylindrical shape and a circular base with an axis A, and further has a closed end or bottom 19. The side wall 12 of the case 10 comprises three visible vent holes 14, 14', 14", and a fourth one which cannot be seen in the figure and is diametrically opposite the vent hole 14. The four vent holes are uniformly distributed around the axis A. A uniform distribution allows the striking stresses to be balanced when several vent holes are simultaneously struck and allows the igniter 1 to avoid becoming imbalanced during its operation.

The case 10 can be shaped by a process of cold striking, for example by stamping from a sheet of soft nickeled steel, such as DC04 or DC06. The case 10 has a thickness comprised between 0.3 and 0.6 mm and advantageously between 0.35 and 0.5 mm, borders included.

The outside diameter of the case is preferably greater than 7 mm, advantageously greater than 10 mm, and is preferably comprised between 12 and 15 mm, borders included.

The vent holes 14, 14', 14" are defined by four weak zones 15, which are local reductions of the thickness of the side wall 12. These weak zones 15 are defined by a profile 16, visible in FIG. 2 and subsequently detailed, which extends along a curved line 17. The curved line 17 has the shape of a U, whose two ends are folded back towards the inside of the U in such a manner as to form a hinge zone, which will allow the vent holes 14, 14', 14" to remain integral with the side wall 12 of the case 10 when they open.

In fact, following the ignition of the igniter 1 by the connection pins 13 and 13' by sending an electrical impulse from the computer of the car in which the igniter 1 is loaded, the combustion of the pyrotechnical material contained inside the case 10 brings about an increase of pressure in the igniter 1. The reduction of thickness of the case 10 at the level of the weak zones 15 causes the vent holes 14, 14', 14" to open at a predetermined pressure defined, among other things, by the thickness of the remaining material and the material of the case, wherein predetermined pressure is lower than the rupture pressure of the case 10 if it does not have the weak zones 15.

This allows a controlled opening of the vent holes 14, 14', 14", which allows the combustion gases to be freed only at the desired pressure, while guaranteeing the integrity of the igniter 1 during its operation. This integrity is important and allows assurance that the particles of the igniter 1 do not interfere with the operation of the device in which it is mounted.

Figure 2:
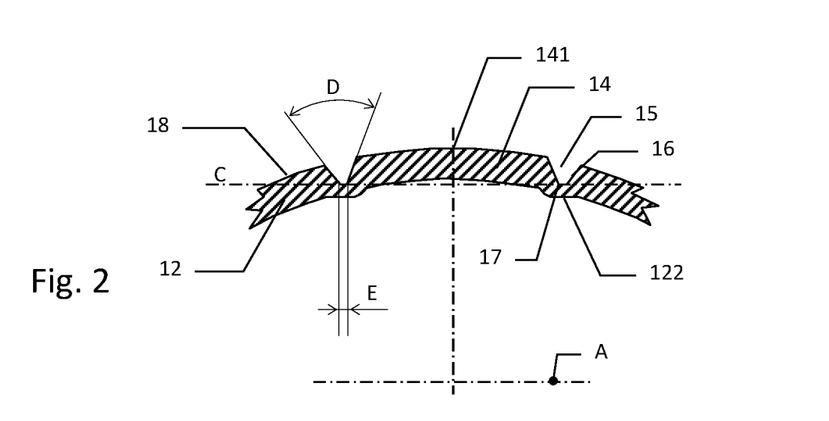
FIG. 2 is a detailed view of a section of the case of the pyrotechnical igniter of FIG. 1 along the axis B-B.

FIG. 2 shows a detailed view of the vent hole 14 according to a section of the case of the pyrotechnical igniter of FIG. 1 along the axis B-B positioned at the level of the vent holes 14, 14', 14".

The profile 16 of the weak zones 15 is triangular, with a truncated point at the bottom of the weak zone 15. The opening angle D of the weak zones 15 is advantageously comprised between 50 and 70 degrees and is preferably 60 degrees. The width of the truncated point E of the profile 16 is comprised between 0.1 and 0.2 mm. The truncated zone is comprised in a plane C.

The thickness of the material remaining at the bottom of the weak zone 15, between the plane C and a plane surface 122 of the case 10, is comprised between 0.05 and 0.2 mm and preferably between 0.07 and 0.15 mm.

It is important to note that the vent hole 14 has a surface 141 (comprised between the two profiles 16 of the FIG. 2), which is curved in and basically cylindrical. This allows the inner volume of the case 10 to be maximised.

Figure 3:
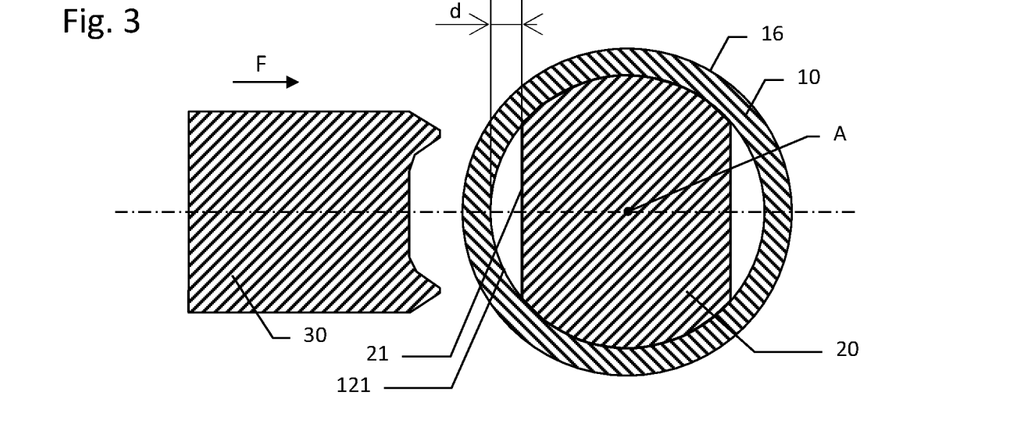
FIG. 3 is a sectional view of the igniter case of FIG. 1, illustrated in a step of the process according to the first aspect of the invention.

FIG. 3 shows a section of the case 10 during the course of a step of the process, according to the first aspect of the invention. The case 10 is positioned on a matrix or die 20, comprising a plane zone 21. The part of the inner surface 121 of the wall 12, comprising at least one curved-in zone, facing this at least one weak zone 15, is positioned along the striking direction F, between the plane zone 21 of the die 20 and the complementary shape of the weak zone 15, present on a punch 30.

Since the case 10 has a lateral outer surface 18 with a generally cylindrical shape with a circular base with an axis A, there is a maximum distance d between the inner surface 121 of the case 10 and the plane zone 21. The distance d will be adjusted as a function of the dimensions of the weak zone 15 to be realised, in order to be as weak as possible, thus to reduce the deformations of the case 10 to a minimum during the strike, and to maximize, in this manner, the inner volume of the case 10. By way of example, for a weak zone 15 comprised in a rectangle of 3 mm by 5 mm (5 mm is the dimension following the general direction of the pins 13 and 13') to be struck on a case 10 of 11.7 mm of inside diameter, the distanced will be 0.4 mm.

Therefore, the process according to the invention proposes directly striking the completely cylindrical case 10 in order to form the weak zone 15, that is, with a profile 16 with a truncated point extending into the plane C, and also with an inner surface 122, which is planar. Therefore, the striking step simultaneously forms the profile 16, the plane C, and the inner plane surface 122, while leaving the surface 141 of the vent hole 14 curved in.

Figure 4:
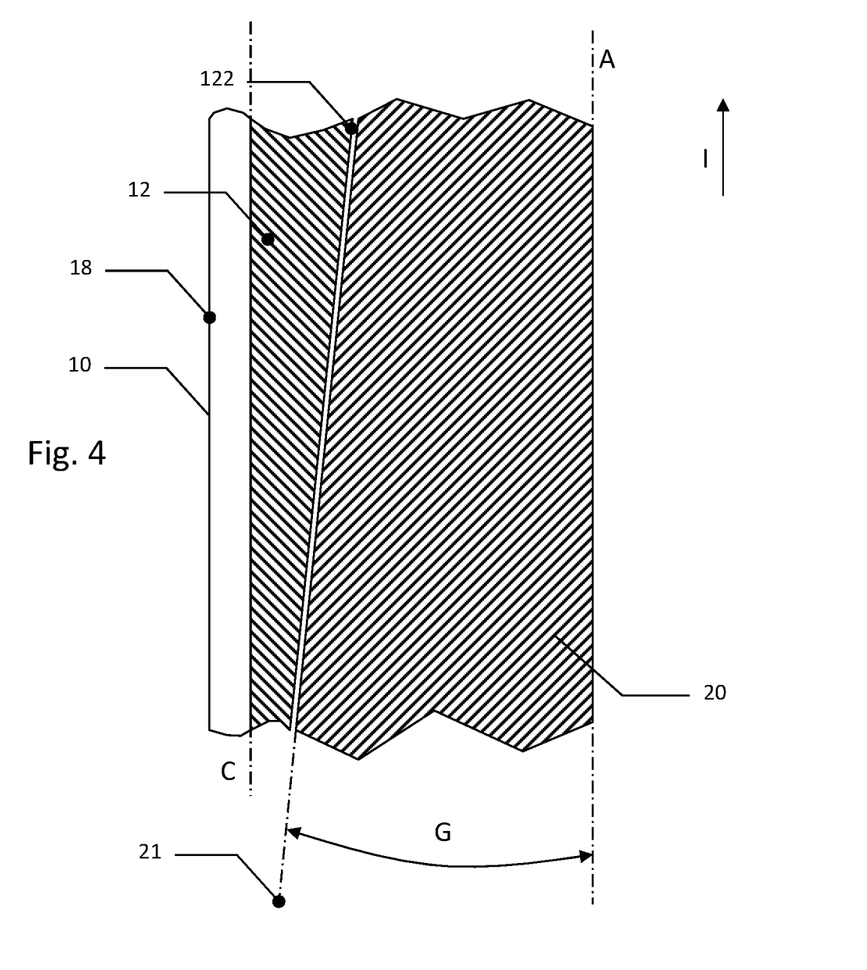
FIG. 4 is a folded-back sectional view at the level of a part of a weak zone, illustrated in the step of the process according to the first aspect of the invention along the segment H-H, shown in FIG. 1.

FIG. 4 shows a folded-back section at the level of a part of a weak zone 15 after the weak zone was struck on the wall 12, according to the process of the invention, and before the ejection of the case 10 from the matrix 20.

The plane zone 21 of the matrix 20 has a clearance angle G with the extraction direction I of the case. In this embodiment, the extraction direction I is parallel to the axis A of the case 10 and is oriented in the opposite direction of the pins 13 and 13', which are not shown. The clearance angle could be comprised between 0 and 1° and advantageously comprised between 0 and 0.5°, including borders.

This clearance angle G causes a variation in the distance between the plane C of the outer surface 18 and the inner plane surface 122, according to the shape of the curved line 17 and the curvature of the inner surface 121. Therefore, according to this embodiment of the weak zone 15 shown in FIG. 1, the clearance angle will allow it to be guaranteed that the lowest distance between the plane C of the outer surface 18 and the inner plane surface 122 will be in the lower zone of the U, in the zone closest to the pins 13 and 13'. It is therefore this lower zone of the weak zone 15 which will be the least resistant to a pressure present inside the case 10. Therefore, it is guaranteed that the vent holes 14, 14', 14" will begin to open in these lower zones and the tear will then be propagated along the curved line 17. This improves the reproducibility of the operation of the manufactured igniters. Furthermore, to the extent that the remainder of the weak zone 15 has a thickness between the plane C and the inner plane surface 122, which is thicker, this allows the propagation of the tear during the opening of the vent holes 14, 14', 14" to be decelerated and assures that these vent holes 14, 14', 14" remain connected to the rest of the wall 12 after the operation of the igniter.

Turning to FIGS. 5-8, another pyrotechnical igniter case in accordance with the present teachings is generally identified at reference character 200. The igniter case 200 primarily differs from the igniter case 10 by incorporating alternative weak zones 202 for vent holes. As with the earlier described igniter case 10, the igniter case 200 has a peripheral side wall 204 and a bottom or closed end 206. The side wall 204 may include a first portion or distal portion 204A at a closed end of the igniter case 200 that has a first outer diameter, a second portion or proximal portion 204B at an open end of the igniter case 200, that has a second, larger outer diameter, and a shoulder 204C, transitioning between the first portion 204A and the second portion 204B. The igniter case 200 is preferably unitarily constructed of metal, including but not limited to nickelled steel and aluminium alloy. In the embodiment illustrated, the igniter case 200 is a thin-walled, metallic case, having a nominal thickness of about 0.6 mm. Other general features of the case 200, not otherwise shown or described, will be understood to be similar to corresponding features of the case 10.

Figure 5:
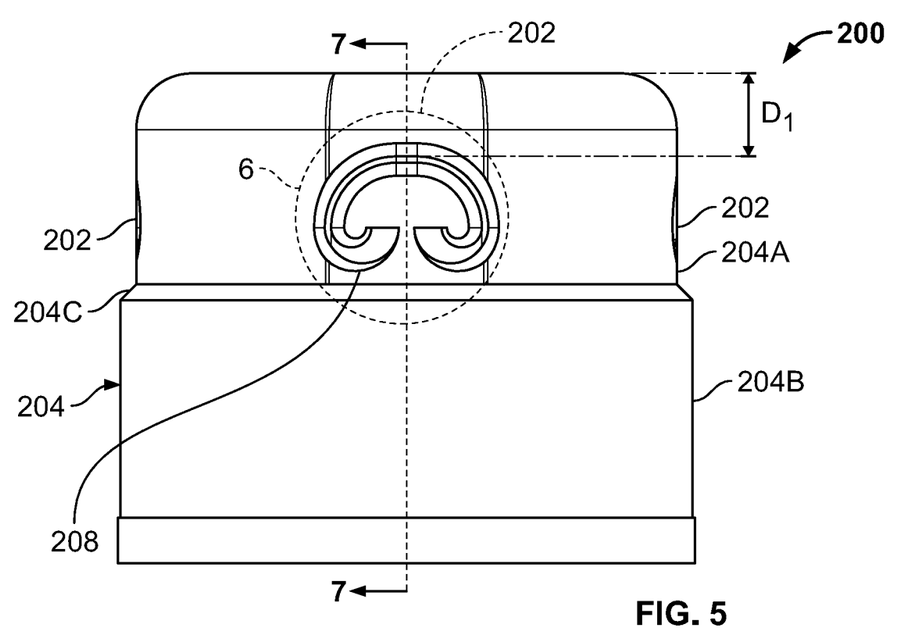
FIG. 5 is a side view of another pyrotechnical igniter case, including at least one weak zone in accordance with the present teachings.

The igniter case 200 is shown to include a plurality of weak zones 202. Specifically, the igniter case 200 includes four weak zones 202 equally spaced about the perimeter of the side wall 204. In alternative applications, the igniter case 200 may include a greater or lesser number of weak zones 202. In the embodiment illustrated, the weak zones 202 are substantially identical and therefore only one of the weak zones will be described in detail. In the follow description, various dimensions are provided for purposes of detailing one particular application of the present teachings. While some of the dimensions or ratios between the dimensions may be critical to certain aspects of the present teachings, in general the exemplary dimensions may be modified within the scope of the present teachings. Explaining further, the particular dimensions of the exemplary weak zone 202 have been adapted for one application in which the side wall 204 has a nominal thickness of approximately 0.6 mm.

Figure 6:
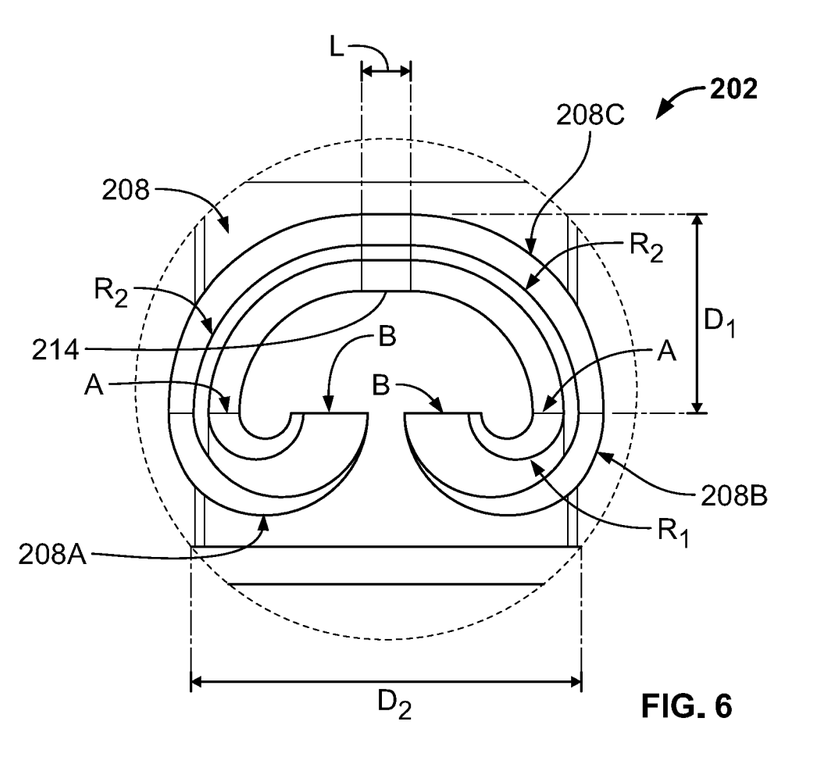
FIG. 6 is an enlarged view of the detail 6 of FIG. 5.
Figure 7:
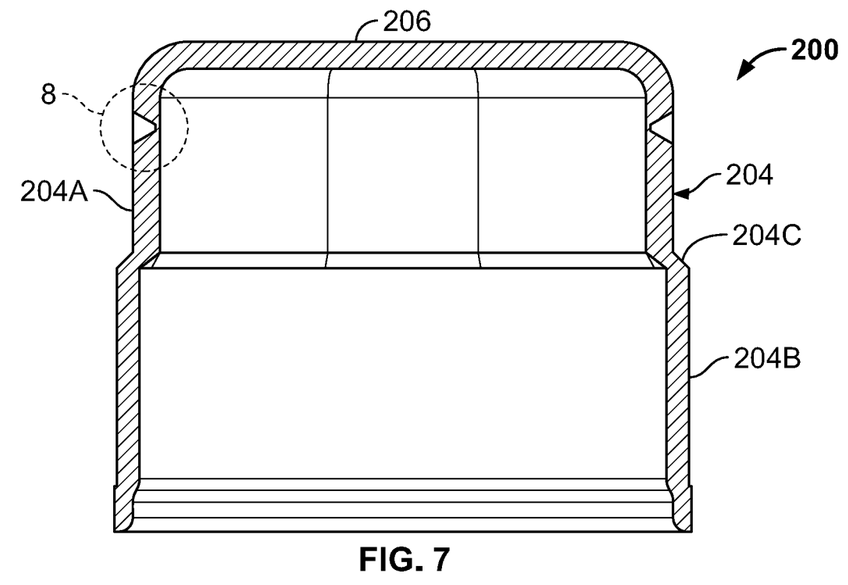
FIG. 7 is a cross-sectional view taken along the line 7-7 of FIG. 5.
Figure 8:
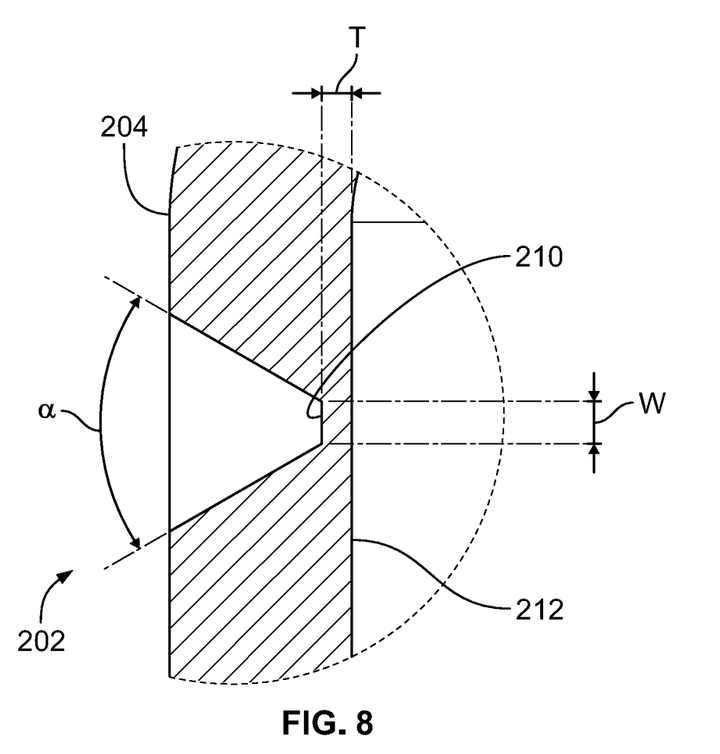
FIG. 8 is an enlarged view of the detail 8 of FIG. 7.

The weak zone 202 extends along a continuous trace 208 that generally includes a first end portion 208A, a second end portion 208B, and an intermediate portion 208C between the first and second end portions 208A and 208B. The profile of the weak zone 202 is generally triangular with a truncated point 210 at the bottom of the weak zone 202. The weak zone 202 defines an opening angle α. The opening angle α is between 50 and 70 degrees and is preferably approximately 60 degrees.

The truncated point 210 is comprised of a plane and has a width. Throughout the intermediate portion 208C of the trace, the width at the truncated point 210 of the trace 208 is a first width $W_1$ of approximately 0.14 mm. A thickness T of material remains at the bottom of the weak zone 202, between the plane defined by the truncated point 210 and the inner surface 212 of the igniter case 200. This thickness T of material varies along the trace 208 (as will be addressed herein), and is alternatively referred to as a side wall depth of the trace 208.

In the embodiment illustrated, the first and second end portions 208A and 208B are substantially identical and are first and second U-shaped portions 208A and 208B. The first and second U-portions 208A and 208B of the trace 208 generally open in a first direction. The first direction is toward the closed end of the igniter case 200. The third portion 208C of the trace 208 generally open in an opposite second direction that is toward the open end of the igniter case 200.

The first and second portions 208A and 208B are defined by a first radius and each extend from a first point A to a second point, through at least 135 degrees, preferably through at least 160 degrees, and more preferably through at least approximately 180 degrees. The first radius $R_1$ is about 0.6 mm. The first point A is adjacent a respective end of the third portion 208C. A side wall depth of the trace 208 transitions from a first side wall depth at the first point A to a second side wall depth at the second point B. As such, the first and second end portions 208A and 208B of the trace 208 transition from the first side wall depth to the second side wall depth in a direction away from the intermediate portion 208C. The transition of the side wall depth between the first point A and the second point B may be a continuous transition. As the side wall depth transitions between the first point A and the second point B from the first side wall depth to the second side wall depth, the width $W_1$ at the truncated point of the trace 208 transitions from the first width $W_1$ to a second width W2. As noted above, the first width $W_1$ is approximately 0.14 mm. The second width W2 is approximately 0.72 mm. This transition of the width at the truncated point of the trace 208 retains the opening angle α as the depth of the recess of trace 208 decreases (e g, the side wall depth ire creases).

The second side wall depth is greater than the first side wall depth. In the embodiment illustrated, the first side wall depth is no greater than approximately 0.15 mm and preferably about 0.1 mm, and the second side wall depth is at least 0.5 mm, preferably at least 0.55 mm, and more preferably about 0.6 mm. Accordingly, in this exemplary application where the nominal side wall thickness is 0.6 mm, at the second point A the trace 208 has a depth of no more than 0.2 mm and preferably about 0.1 mm.

The third portion 208C of the trace 208 is defined by two second radii $R_2$ and a central segment 214. The second radii $R_2$ are both approximately 1.57 mm and both extend through approximately 90 degrees from the first point A of the adjacent one of the first and second portions 208A and 208B to the central segment 214. The central segment 214 is a linear segment having a length L of approximately 0.46 mm. The third portion 208C of the trace 208 has a first dimension $D_1$ along the axis of the igniter case 200 and a second dimension $D_2$ perpendicular to the first dimension $D_1$. The first dimension $D_1$ is approximately 2.17 mm and the second dimension $D_2$ is approximately 3.6 mm.

The intermediate portion 208C of the trace 208 may have a uniform side wall depth extending between the first and second portions 208A and 208B. The uniform side wall depth of the intermediate portion 208C of the trace 208 is approximately equal to the first side wall depth at point A of the first and second portions 208A and 208B. As such, the uniform side wall depth is no greater than approximately 0.15 mm and preferably about 0.1 mm.

The trace 208 of the weak zone 202 is manufactured by positioning the igniter case 200 on a die and striking the peripheral side wall with a punch. In a single movement of striking, the punch defines the first and second end portions 208A and 208B of the trace 208 to transition from the first point A, having the first side wall depth, to the second point B, having the second side wall depth. The plurality of weak zones 202 of the exemplary embodiment may be simultaneously defined in the igniter case 200 with a plurality of punches. The uniform distribution of the weak zones 202 allows striking stresses to be balanced when several weak zones 202 are simultaneously struck, and also allows the igniter to remain balanced during its operation.

The igniter case 200 may be incorporated into a pyrotechnical igniter for a vehicle safety device, such as an inflatable airbag or seatbelt pretensioner. A predetermined increase of pressure within the igniter case 200 will first cause failure of the weak zones 202 at the intermediate portion 208C of the trace 208. The failure of the weak zone 202 will quickly propagate from the intermediate portion 208C along the first and second portions 208A and 208B. The shape of the trace 208 forms a hinge zone that allows displaced side wall material, creating corresponding vent holes, to remain integral with the side wall 204 of the igniter case 200 upon opening. In this manner, gas may be favourably directed for operation of the safety device.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A metallic case for a pyrotechnical igniter of a gas generator for a vehicle safety device, the metallic case comprising:
   a peripheral side wall;
   a closed end; and
   a weak zone in the peripheral side wall, the weak zone extending along a continuous trace having a first end portion, a second end portion, and an intermediate portion between the first and second end portions, the first and second end portions of the continuous trace both transitioning from a first point, having a first side wall depth, to a second point, having a second side wall depth, the second side wall depth being greater than the first side wall depth,
   wherein the weak zone is configured for opening a vent in the peripheral side wall in response to an increase of pressure within the metallic case,
   wherein the first and second end portions of the continuous trace both have the first side wall depth adjacent to the intermediate portion, and both transition from the first side wall depth to the second side wall depth in a direction away from the intermediate portion,
   wherein the first and second end portions of the continuous trace are first and second U-shaped portions, both having a first leg proximate the intermediate portion at the first point and a second end, the depth of both of the first and second portions of the continuous trace continuously transitioning from a minimum side wall depth at the first point to a maximum side wall depth at the second end, such that the first and second end portions function to slow tearing of the peripheral side wall, as the tearing propagates from the intermediate portion of the continuous trace along the first and second end portions to thereby retain a hinged portion defining the vent.

2. The metallic case for a pyrotechnical igniter of claim 1, wherein the peripheral side wall is a generally cylindrical side wall.

3. The metallic case for a pyrotechnical igniter of claim 1, wherein the first and second end portions of the continuous trace both continually transition from the first side wall depth to the second side wall depth.

4. The metallic case for a pyrotechnical igniter of claim 1, wherein the first side wall depth is no greater than about 0.1 mm.

5. The metallic case for a pyrotechnical igniter of claim 1, wherein the peripheral side wall has a nominal wall thickness and the second side wall depth is approximately equivalent to the nominal wall thickness.

6. The metallic case for a pyrotechnical igniter of claim 5, wherein the nominal wall thickness of the peripheral side wall is approximately 0.45 mm to approximately 0.7 mm.

7. The metallic case for a pyrotechnical igniter of claim 1, wherein the intermediate portion of the continuous trace has a uniform side wall depth.

8. The metallic case for a pyrotechnical igniter of claim 7, wherein the uniform side wall depth of the intermediate portion of the continuous trace is no greater than about 0.1 mm.

9. The metallic case for a pyrotechnical igniter of claim 1, wherein the intermediate portion of the continuous trace is a third U-shaped portion, the first and second U-shaped portions of the continuous trace open in a first direction, and the third U-shaped portion of the continuous trace opens in a second direction, the first direction being opposite to the second direction.

10. The metallic case for a pyrotechnical igniter of claim 1, further comprising at least one additional weak zone, such that the peripheral side wall includes a plurality of weak zones, each extending along a respective continuous trace having a respective first end portion, a respective second end portion, and a respective intermediate portion between the first and second respective end portions, the respective first and second end portions of the respective continuous trace both transitioning from the first side wall depth to the second side wall depth.

11. The metallic case for a pyrotechnical igniter of claim 1, in combination with the pyrotechnical igniter.

12. A method of manufacturing the metallic case for a pyrotechnical igniter of claim 1, the method comprising:
   positioning the metallic igniter case on a die; and
   striking the peripheral side wall with a punch to, in a single movement of striking, define the first and second end portions of the continuous trace to transition from the first point having the first side wall depth to the second point having the second side wall depth.

13. A metallic case for a pyrotechnical igniter of a gas generator for a vehicle safety device, the metallic case comprising:
   a peripheral side wall having an axis;
   a closed end; and
   a weak zone in the peripheral side wall, the weak zone extending along a continuous trace having a first U-shaped portion, a second U-shaped portion, and a third U-shaped portion between the first and second U-shaped portions, the first and second U-shaped portions generally open in a first direction parallel to the axis and extend through approximately 180 degrees, the third U-shaped portion generally opens in a second direction parallel to the axis, the second direction being opposite the first direction,
   wherein the weak zone is configured for opening a vent in the peripheral side wall in response to an increase of pressure within the metallic case, such that the vent opens along the weak zone.

14. The metallic case for a pyrotechnical igniter of claim 13, wherein a shape of the continuous trace forms a hinge zone, allowing displaced side wall material and creating a corresponding vent hole in the peripheral side wall to remain integral with the peripheral side wall upon opening.

15. The metallic case for a pyrotechnical igniter of claim 13, further comprising one or more additional weak zones in the peripheral side wall, such that the peripheral side wall includes a plurality of weak zones.

16. The metallic case for a pyrotechnical igniter of claim 15, wherein weak zones of the plurality of weak zones are equally spaced about a perimeter of the peripheral side wall.

17. The metallic case for a pyrotechnical igniter of claim 13, in combination with the pyrotechnical igniter.

18. A metallic case for a pyrotechnical igniter of a gas generator for a vehicle safety device, the metallic case comprising:
- a peripheral side wall;
- a closed end; and
- a weak zone in the peripheral side wall, the weak zone extending along a continuous trace having a first curved end portion, a second curved end portion, and an intermediate U-shaped portion between the first and second curved end portions, the first and second curved end portions of the continuous trace both transitioning away from the intermediate U-shaped portion from a first point, having a first side wall depth, to a second point, having a second side wall depth, the second side wall depth being greater than the first side wall depth,
- wherein the weak zone is configured for opening a vent in the peripheral side wall in response to an increase of pressure within the metallic case.

19. The metallic case for a pyrotechnical igniter of a gas generator for a vehicle safety device of claim 18, the weak zone has a general triangular profile.

20. The metallic case for a pyrotechnical igniter of a gas generator for a vehicle safety device of claim 19, wherein the weak zone defines an opening angle between 50 degrees and 70 degrees.

21. The metallic case for a pyrotechnical igniter of a gas generator for a vehicle safety device of claim 19, wherein the generally triangular profile of the weak zone is truncated at a bottom of the weak zone.

22. The metallic case for a pyrotechnical igniter of a gas generator for a vehicle safety device of claim 21, wherein the bottom of the weak zone is planar.

23. The metallic case for a pyrotechnical igniter of a gas generator for a vehicle safety device of claim 18, wherein the weak zone has a planar bottom surface having a width, the width of the planar bottom surface transitioning along both of the first and second curved end portions from a first width at the first point to a second width at the second point, the second width being greater than the first width.

* * * * *